United States Patent
Kim et al.

(10) Patent No.: US 9,437,875 B2
(45) Date of Patent: Sep. 6, 2016

(54) HIGHLY ELASTIC PHYSICALLY CROSS-LINKED BINDER INDUCED BY REVERSIBLE ACID-BASE INTERACTION FOR HIGH PERFORMANCE SILICON ANODE

(71) Applicant: INCHEON UNIVERSITY INDUSTRY ACADEMIC COOPERATION FOUNDATION, Incheon (KR)

(72) Inventors: Tae Hyun Kim, Incheon (KR); Sang Hyun Lim, Incheon (KR); Ho Dong Chu, Incheon (KR); Kuk Joo Lee, Incheon (KR)

(73) Assignee: INCHEON UNIVERSITY INDUSTRY ACADEMIC COOPERATION FOUNDATION, Incheon (KR)

( * ) Notice: Subject to any disclaimer, the term of this patent is extended or adjusted under 35 U.S.C. 154(b) by 0 days.

(21) Appl. No.: 14/682,599

(22) Filed: Apr. 9, 2015

(65) Prior Publication Data

US 2016/0233511 A1 Aug. 11, 2016

(30) Foreign Application Priority Data

Feb. 9, 2015 (KR) ........................ 10-2015-0019756

(51) Int. Cl.
| | |
|---|---|
| *H01M 4/62* | (2006.01) |
| *H01M 4/38* | (2006.01) |
| *C08L 1/08* | (2006.01) |
| *C08L 5/04* | (2006.01) |
| *C08L 33/02* | (2006.01) |
| *C08L 65/00* | (2006.01) |
| *C08G 61/12* | (2006.01) |
| *H01M 4/02* | (2006.01) |

(52) U.S. Cl.
CPC ............. *H01M 4/622* (2013.01); *H01M 4/386* (2013.01); *H01M 2004/027* (2013.01)

(58) Field of Classification Search
CPC ....... H01M 4/622; H01M 4/386; C08L 1/08; C08L 5/04; C08L 33/02; C08L 65/00

USPC ........................................................ 525/186
See application file for complete search history.

(56) References Cited

U.S. PATENT DOCUMENTS

| | | | | |
|---|---|---|---|---|
| 6,800,680 B2 * | 10/2004 | Stark | ..................... | C09J 7/0203 |
| | | | | 428/346 |
| 2012/0088155 A1 * | 4/2012 | Yushin | ................... | H01M 2/16 |
| | | | | 429/217 |

FOREIGN PATENT DOCUMENTS

| | | | | |
|---|---|---|---|---|
| JP | 2012-014920 | 1/2012 | ............. | H01M 4/62 |
| KR | 10-2014-0117313 | 10/2014 | ............. | H01M 4/62 |
| KR | 10-2015-0000063 | 1/2015 | ............. | H01M 4/62 |

OTHER PUBLICATIONS

Feng et al., "Novel method for the preparation of ionically cross-linked sulfonated poly(arylene ether sulfone)/polybenzimidazole composite membranes via in-situ polymerization," J. Membrane Science 346 (2010) 105-112.*
Hodong Chu, et al., "Physically cross-linked polymeric system as a novel binder for Si Anode." Poster Presentation on Apr. 10, 2014 at The Korea Electrochemical Society, pp. 18-43.
Sanghyun Lim, et al., "Poly(acrylic acid) blend with poly(benzimidazole) as a novel binder for Si negative electrode in Li-ion battery." Poster Presentation on Apr. 19, 2014 at the Polymer Society of Korea, pp. 64-94.
Korean Office Action dated Feb. 16, 2016 issued for Korean Application No. 10-2015-0019756. No English Translation available.

* cited by examiner

*Primary Examiner* — Fred M Teskin
(74) *Attorney, Agent, or Firm* — Harness, Dickey & Pierce, P.L.C.

(57) ABSTRACT

Provided is a highly elastic physically cross-linked binder induced by reversible acid-base interaction for high performance silicon anode, and more particularly to a highly elastic physically cross-linked binder induced by reversible acid-base interaction for high performance silicon anode, in which the binder has excellent stiffness and elasticity. To this end, the polymer binder that is physically crosslinked with a crosslinking agent by acid-base interaction may include a crosslinking agent that is physically bound with the binder for silicon anode by reversible acid-base interaction with the binder for silicon anode.

7 Claims, 13 Drawing Sheets

HIGHLY ELASTIC PHYSICALLY CROSS-LINKED BINDER INDUCED BY REVERSIBLE ACID-BASE INTERACTION FOR HIGH PERFORMANCE SILICON ANODE

CROSS-REFERENCE TO RELATED PATENT APPLICATION

This application claims priority from Korean Patent Application No. 10-2015-0019756, filed on Feb. 9, 2015 in the Korean Intellectual Property Office, the disclosure of which is incorporated herein by reference in its entirety.

FIELD

The following description relates to a highly elastic physically cross-linked binder, induced by reversible acid-base interaction and bound to a crosslinking agent by electrostatic attraction, for high performance silicon anode.

BACKGROUND

Silicon is abundant in nature and is receiving attention as an eco-friendly and high-capacity anode material having theoretical capacity of as much as 4200 mAh/g. However, commercialization of silicon-based materials has been hindered by low electric conductivity and large volume change of 400% during cell operation, which leads to a drastic capacity decrease. Therefore, there has been recently suggested a method of improving low electric conductivity of silicon electrodes by producing a silicon-carbon composite using a pyrolysis method or the like, or by using a conductive polymer binder (see FIG. 1). While such method may improve high rate capability by improving electric conductivity, the method is difficult to perform and has a limited effect of improving cycle life since a conductive material is separated due to a volume change.

There is another method of improving the performance of a silicon electrode by synthesizing silicon in the form of nanotubes to suppress the effect caused by volume change (see FIG. 2). However, the method is also difficult to perform and to commercialize.

Further, there is an attempt to reduce the effect of volume change by reducing the size of silicon particles or by using a host material, such as graphite. The method is particularly useful relative to other methods that change the structure of silicon, but also has problems of high production costs and deteriorated cycle life characteristics during a long-term charging/discharging process.

The above methods focus on modification of materials directly related to cycle life deterioration. However, since the methods may not be a fundamental solution to suppress volume expansion of silicon, a binder, which is another material in an electrode, is currently receiving attention. A binder binds various materials in an electrode and is affected the most by physical stress caused by the volume change of a silicon-based material. Recent studies have found that by strengthening physical properties of a binder material, separation of a conductive material may be prevented, and pulverization and isolation of silicon particles may be suppressed, thereby improving life cycle characteristics of a battery. From the viewpoint of improving the physical properties of a polymer binder, researchers have conducted much research on various materials, such as poly acrylic acid (PAA), carboxymethyl cellulose (CMC), alginate, conductive polymers, and the like, to be used as a binder material instead of poly(vinylidene fluoride) (PVDF) that is commonly used as a binder material for battery. They have come to a conclusion that, a polymer having a polar functional group, such as —OH or —COOH, which can strongly interact with Si—OH (silanol) that is an oxide film on the surface of silicon particles, is suitable as a next generation binder material.

By introducing a polar functional group for a binder material, adhesive strength with a silicon material may be enhanced, and separation of silicon particles may be suppressed. However, even by using a polar polymer, deterioration of a binder material caused by volume change during cell operation may not be prevented, and a problem with long-term cell performance still remains. Accordingly, in order to prevent deterioration of a polymer material caused by the volume change, a cross-linking system has been recently introduced in which by cross-linking a polymer material, physical properties and cell performance have been improved. However, the system also has problems in that long-term cell performance may not be ensured, since physical stress due to a continuous volume change leads to deterioration of the crosslinking. As an irreversible cross-linking system, Korean Patent Publication No. 10-2015-0000063 discloses "an optically cross-linked poly(acrylic acid) binder for silicon anode".

Accordingly, there is a need for a binder material for a cross-linking system in which physical properties may be recovered and maintained by having strong binding force and rebinding may be enabled even when binding is broken.

Patent Documents cited in Background section include: (1) Korean Patent Publication No. 10-2015-0000063 and (2) Korean Patent Publication No. 10-2014-0117313.

SUMMARY

In order to solve the above problems, provided is a highly elastic physically cross-linked binder induced by reversible acid-base interaction for high performance silicon anode having excellent stiffness, elasticity, and adhesion.

Along with the above objective, other objectives of the present invention and the merits thereof will be more apparent with reference to the following disclosure of preferred exemplary embodiments.

In one general aspect, there is provided is a highly elastic physically cross-linked binder induced by reversible acid-base interaction for high performance silicon anode, the binder including: a binder for silicon anode; and a cross-linking agent that is physically bound with the binder for silicon anode by reversible acid-base interaction.

The silicon anode may preferably be prepared by using silicon or silicon-graphite composite material.

The binder for silicon anode may preferably be at least one selected from among a group consisting of poly(acrylic acid) (PAA), carboxymethyl cellulose (CMC), and alginate.

The crosslinking agent may preferably include both a hydrogen bond donor and a hydrogen bond acceptor.

The crosslinking agent may preferably be at least one selected from among a group consisting of poly(benzimidazole), guanidine-based polymers, imidazole-based polymers, polyaniline polymers, and polypyridine-based polymers.

The binder for silicon anode may preferably be poly (acrylic acid) (PAA), and the crosslinking agent may preferably be poly(benzimidazole).

The crosslinking agent may preferably be contained in an amount of 1 to 3% by weight compared to a weight of the binder for silicon anode.

DETAILED DESCRIPTION

Figure 1:
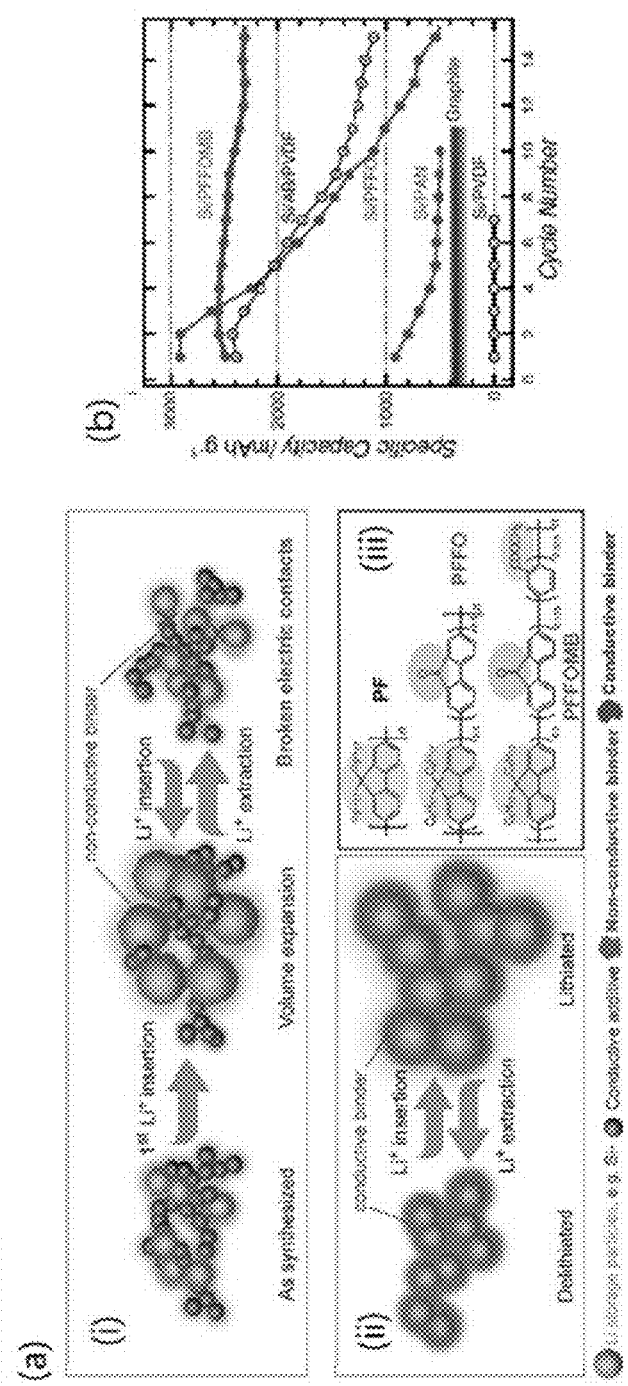
FIG. 1 (A) schematically illustrates a method of addressing a volume change issue in battery materials, showing: (i) a traditional method using a conductive material; (ii) a conductive polymer with dual functionality; and (iii) a molecular structure of a conductive polymer, and FIG. 1 (B) illustrates cycling performance of a Si/conductive polymer composite electrode.
Figure 2:
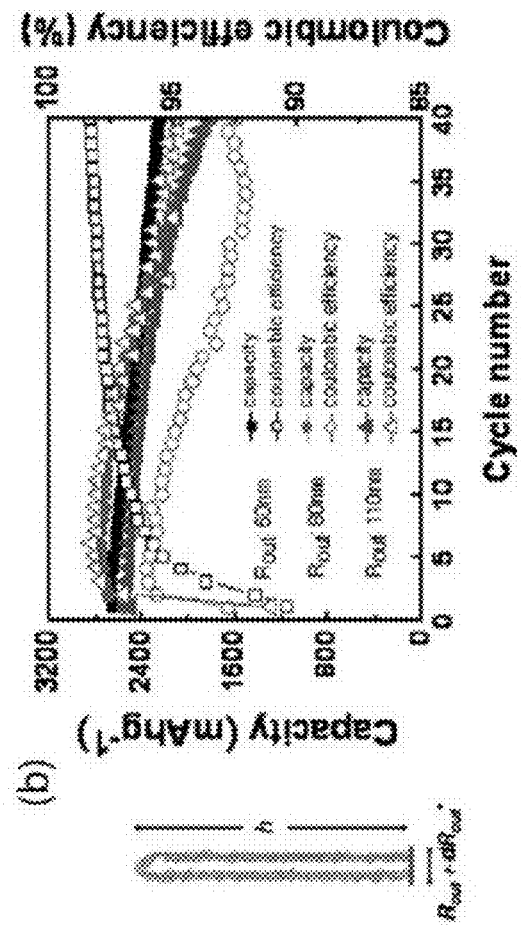
FIG. 2 (A) schematically illustrates silicon nanotubes (SiNTs) before reaction and after full lithiation and after delithiation, and FIG. 2 (B) illustrates cyclic performance of SiNT electrode.
Figure 2:
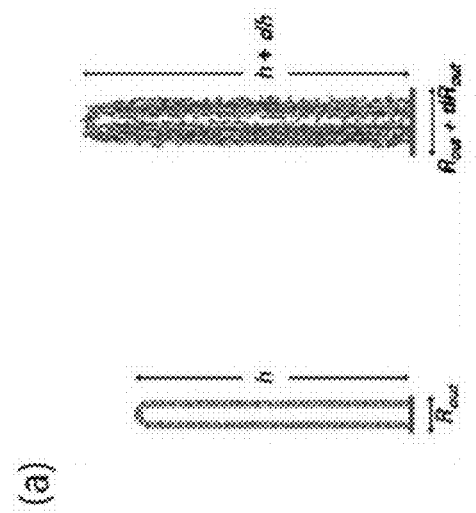

Unless otherwise defined, all terms (including technical and scientific terms) used herein have the same meaning as commonly understood by one of ordinary skill in the art to which this invention belongs. If a term in the present application contradicts or conflicts with a term in the incorporated reference, the term from the present application takes precedence over the conflicting term from the incorporated reference.

Although methods and ingredients similar or identical to those described in the present disclosure may be applied to embodiments or tests of the present invention, the present disclosure provides an appropriate method and ingredient.

In one embodiment, the highly elastic physically cross-linked binder induced by reversible acid-base interaction for high performance silicon anode includes a cross-linking agent that is physically cross-linked with a binder for silicon anode by reversible acid-base interaction.

In one example, silicon anode may be produced by using silicon or silicon-graphite composite material, but is not limited thereto, and other composite materials that include silicon may also be used. That is, the binder for silicon anode refers to a binder that is used for not only a silicon anode material, but also a silicon-graphite anode material, and any other anode material that includes silicon.

In one example, the binder for silicon anode is an eco-friendly and high-capacity binder. The binder binds an electrode active material of several to tens of micrometers with an electric conductive material of tens of nanometers, and helps an electrode coating layer to firmly adhere to a current collector. The most important characteristic of the binder is adhesive strength. The initial adhesive strength should be maintained even in an environment where there is an excessive amount of organic electrolytes or even after a long-term electric and chemical evaluation is performed. Further, in order to manufacture electrode slurry effectively, solubility of a solvent should be sufficiently high; a binder should not be dissolved even by swelling in an environment where there is an excessive of organic electrolytes; and a binder should not be dissolved in an electrochemical oxidation/reduction environment.

Particularly, since a silicon anode material is subject to significant volume change, the volume change of a binder for silicon anode should be suppressed effectively and the binder for silicon anode should have excellent mechanical properties. However, although a polymer binder material has excellent mechanical properties, the material begins to deform plastically if an external force beyond its yield strength (a maximum point at which a material may maintain elasticity) is applied, which leads to deterioration of a material. Specifically, if a binder material is deteriorated, silicon particles are separated from a current collector while the volume of the silicon particles are changed; the silicon particles are pulverized such that the silicon particles may not be firmly bound to a conductive material (carbon black), thereby causing some particles to be electrically isolated; and the isolated particles may not participate in an electrochemical reaction, thereby leading to deterioration of cell performance. Therefore, a polymer binder should have excellent mechanical properties and elasticity.

As the binder for silicon anode has excellent binding characteristics and stiffness that may resist volume expansion, the binder for silicon anode may be at least one selected from among a group consisting of poly acrylic acid (PAA), carboxymethyl cellulose (CMC), and alginate.

The cross-linking agent is basic and is physically bound to the binder for silicon anode by electrostatic attraction. The cross-linking agent may have both a hydrogen bond donor and a hydrogen bond acceptor. The cross-linking agent may be at least one selected from among a group consisting of polybenzimidazole, guanidine-based polymers, imidazole-based polymers, polyaniline polymers, and polypyridine polymers. However, any cross-linking agent that satisfies the above requirements may be used. For excellent adhesive strength and stiffness, polybenzimidazole is preferred.

The binder for silicon anode is preferably poly(acrylic acid) (PAA), and the cross-linking agent is preferably polybenzimidazole. The polymer binder for silicon anode, produced by blending poly(acrylic acid) and polybenzimidazole, is physically bound to a cross-linking agent by reversible acid-base interaction, and may be synthesized as represented by the following Formula 1.

which may be commercially obtained. Further, in order to exclude effects, caused by drastic volume change, on cycle life characteristics during the initial development of silicon cells, nano-sized silicon particles and graphite are combined to be used as an active material.

Preparation Example

Synthesis of poly(benzimidazole)

Terephthalic acid (1) monomer and 3 3'-diaminobenzidine (2) monomer were mixed in a molar ratio of 1:1, and the Formula 1

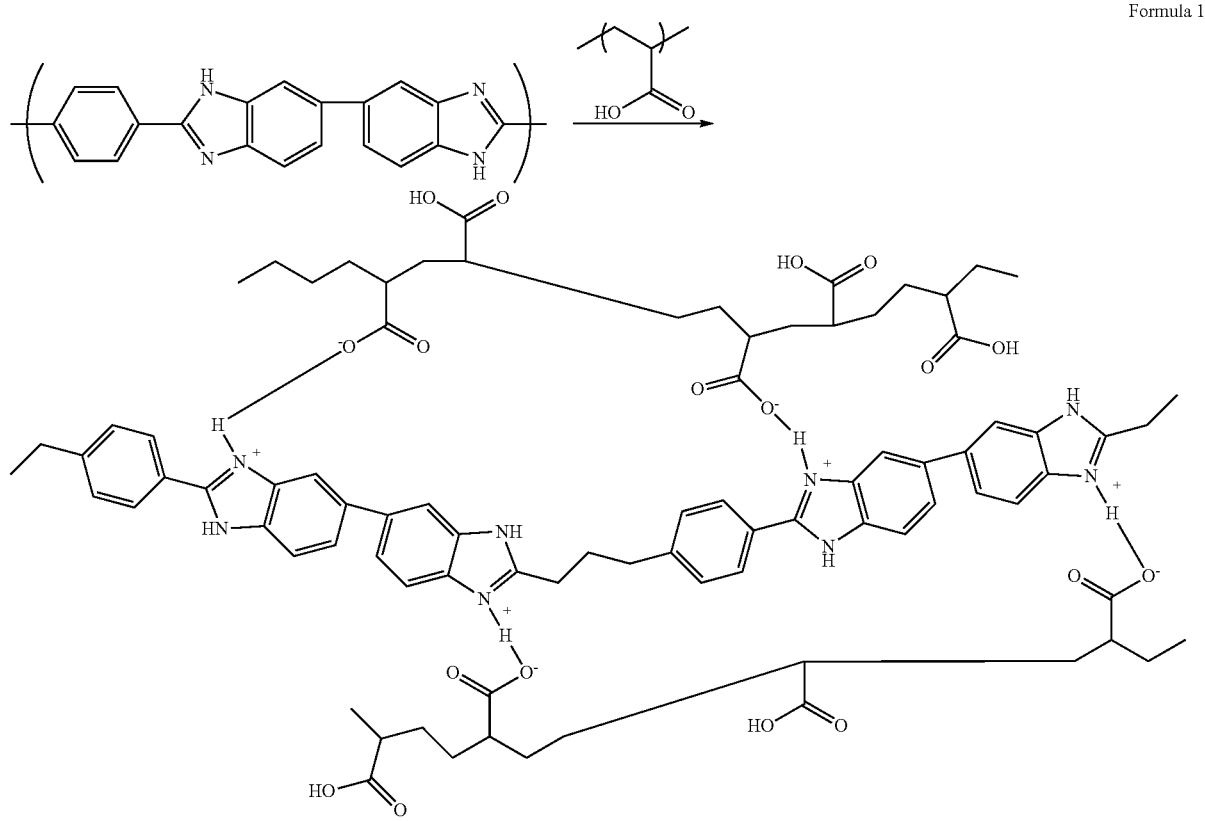

The cross-linking agent is preferably contained in an amount of 1 to 3% by weight of the binder for silicon anode. In the case where the cross-linking agent is contained in an amount that is below 1% by weight of the binder for silicon anode, the degree of cross-linking with the binder for silicon anode is so low that stiffness, elasticity, and adhesive strength with a silicon anode material may not be enhanced. Further, in the case where the cross-linking agent is contained in an amount that is above 3% by weight, acid-base bond is formed excessively, thereby degrading adhesive strength with a silicon anode material, and reducing elasticity of the binder.

Hereinafter, the present disclosure and its effects will be described in further detail with reference to an Example and Comparative examples. However, it is to be understood that these examples are merely illustrative for explanation, and the present disclosure is not limited thereto.

Materials used in examples and comparative examples according to the present disclosure are as follows.

Poly(acrylic) acid is used as a binder for silicon anode, and poly(benzimidazole) is used as a cross-linking agent, mixture was heated and polymerized for 12 hours (nucleophilic acyl substitution). Then, the resulting mixture was precipitated using distilled water and was neutralized using calcium carbonate. Thereafter, the mixture was washed with distilled water for several times to obtain poly(benzimidazole) (PBI, 3) brown powder. The reaction formula is as follows:

Formula 2

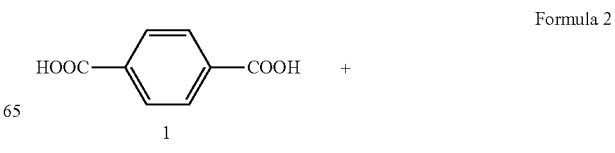

1

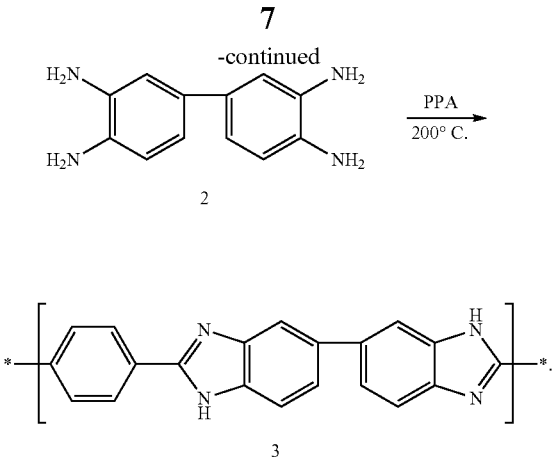

3

Example

After melting poly(benzimidazole) (3), which was prepared in the production example, in an N-methyl-2-pyrrolidone solution at 60° C., the resulting solution was mixed with a poly(acrylic acid) (PAA) solution, in which poly (benzimidazole) was used in an amount of 2% by weight compared to the weight of poly(acrylic acid). The mixed solution of poly(acrylic acid) and poly(benzimidazole) was evenly sprayed on a Teflon mold covered with a copper foil, and then was dried in an oven at 80° C. for 72 hours to produce a PAA-PBI blend film (IW2-2), which is indicated as Example (IW2-2). Comparative Examples 1 and 2

A PAA-PBI blend film (IW2-5) was prepared in the same manner as in the Example, except that poly(benzimidazole) was used in an amount of 5% by weight compared to the weight of poly(acrylic acid), which is indicated as Comparative example 1 (IW2-5). Further, a pure PAA film was prepared in the same manner as in the Example without using poly(benzimidazole), i.e., by using only poly(acrylic acid), which is indicated as Comparative example 2 (PAA).

Experimental Example 1

Figure 3:
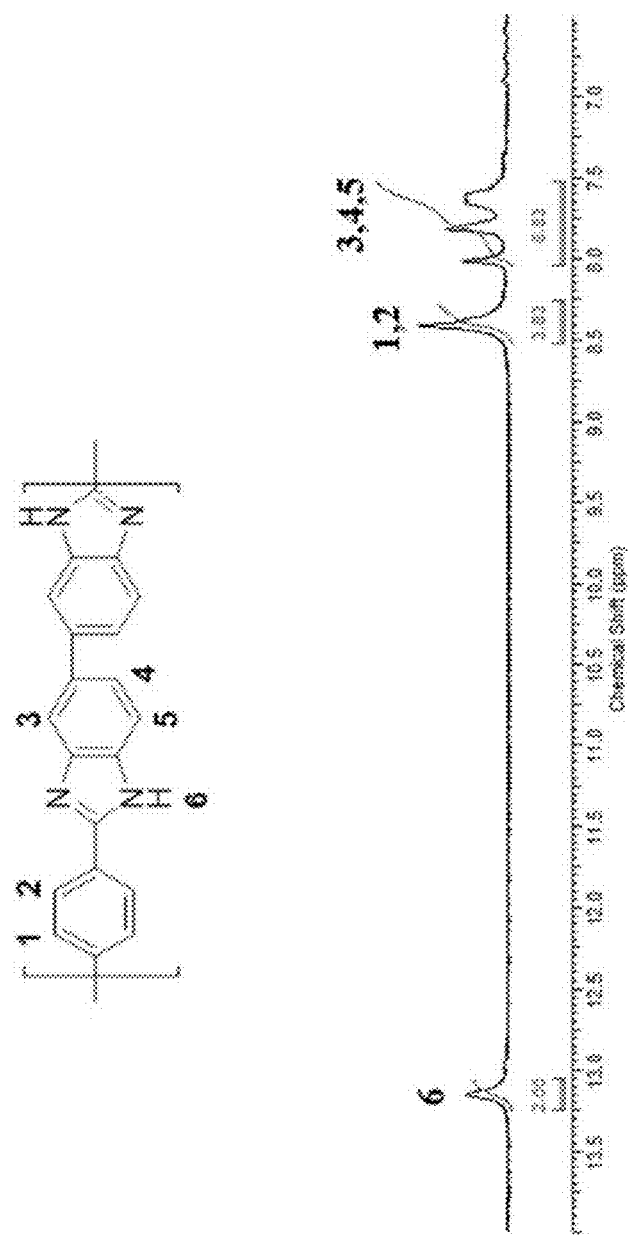
FIG. 3 illustrates $^1$H-NMR spectrum of polybenzimidazole in $d_6$-DMSO.

Analyzing and Checking the Structure of Poly(Benzimidazole) by $^1$H-NMR Spectroscopy By adding poly(benzimidazole) (PBI, 4) prepared in the preparation example to dimethyl sulfoxide, which is a polar solvent, and by heating and melting the resulting solvent, the structure of poly(benzimidazole) was analyzed and checked by $^1$H-NMR spectroscopy, and the result is shown in FIG. 3.

Experimental Example 2

Figure 4:
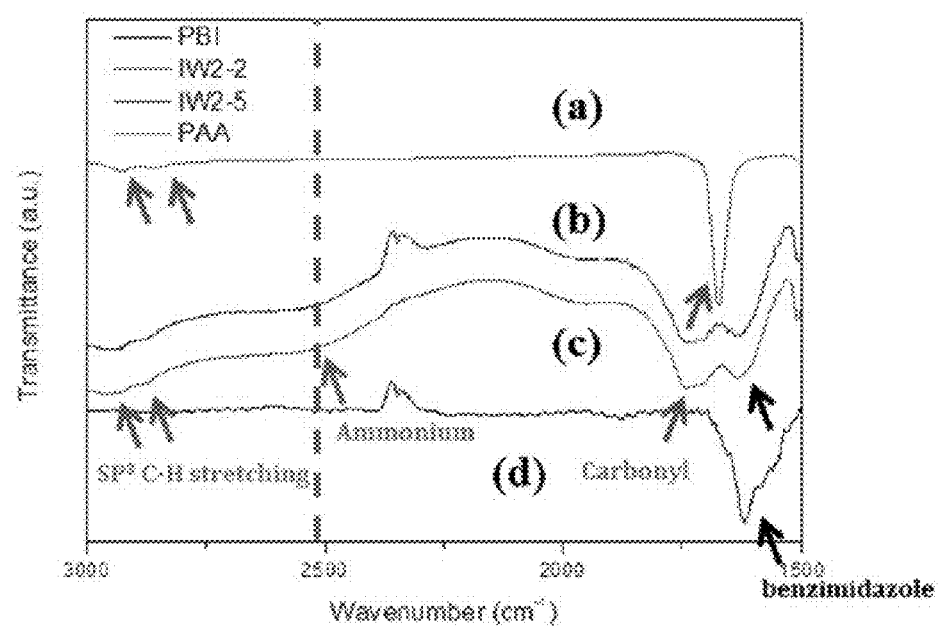
FIG. 4 illustrates FT-IR spectra of (a) PBI, (b) Example, (c) Comparative example 1, and (d) Comparative example 2.

Analyzing and Checking the Structure of Example and Comparative Examples by FT-IR Spectroscopy The Example (IW2-2), Comparative example 1 (IW2-5), and Comparative example 2 (PAA) are compared with poly(benzimidazole) powder (PBI, poly(benzimidazole) is difficult to be prepared as a separate film due to low solubility and viscosity) using FT-IR spectroscopy. The result is shown in Table 1 and FIG. 4 below.

TABLE 1

| Ammonium peak | |
| --- | --- |
| Binder | Ammonium peak(cm$^{-1}$) |
| PAA | ND |
| IW2-2 | 2565 |
| IW2-5 | 2550 |

Comparative example 2 (PAA) exhibits an absorption band at 2930 cm$^{-1}$ due to the stretching of C—H bond, and poly(benzimidazole) (PBI) exhibits a peak characterized by aromatic C=C bond at 1620 cm$^{-1}$. PAA-PBI blend films (Example and Comparative example 1) exhibit peaks characteristic of both poly(acrylic acid) and poly(benzimidazole), and exhibits a broad band at 2550 cm$^{-1}$, which is characteristic of an ammonium salt which is a polymerization reaction product of PAA and PBI. Further, with the increase in an added amount of poly(benzimidazole), the ammonium peak was shifted to a lower wavenumber. The shift could indicate that the increase in the degree of crosslinking may cause decrease in average bonding strength of an N—H bond of ammonium salt.

Experimental Example 3

Measuring and Checking the Adhesive Strength of Example and Comparative Examples (Bulk-Scale)

Figure 5:
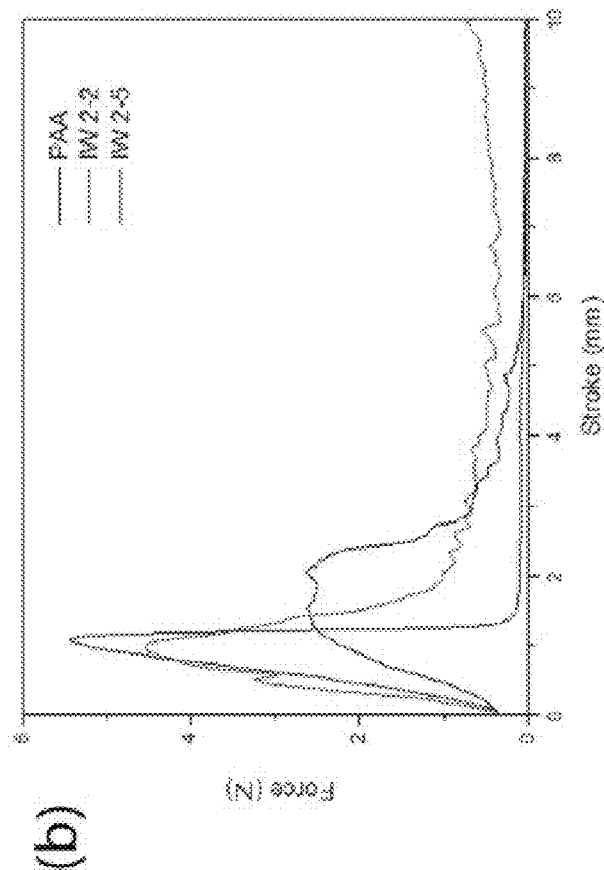
FIG. 5 (A) schematically illustrates a peel test, and FIG. 5 (B) illustrates stroke vs. force curves for the Example and Comparative examples 1 and 2.
Figure 5:
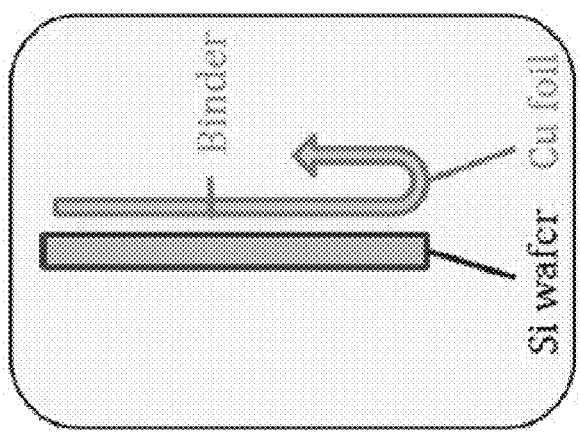

After applying binders of the Example and Comparative examples over a silicon (Si) wafer that was cut into a regular size (1 cm$^2$ in width), a copper foil was attached to the Si wafer and was dried in an oven at 80° C., to carry out a peel test by using a universal testing machine (UTM). The result is shown in Table 2 and FIG. 5 below.

TABLE 2

| Maximum adhesive strength (N) of the binders | |
| --- | --- |
| Binder | Maximum force(N) |
| PAA | 2.6 |
| IW2-2 | 4.5 |
| IW2-5 | 5.4 |

The Example and Comparative example 1 exhibit a higher adhesive strength than Comparative example 2 in a bulk scale. In addition, as the amount of a cross-linking agent is increased, adhesive strength is increased (4.5 N in the Example and 5.4 N in Comparative example 1).

Experimental Example 4

Measuring and Checking Adhesive Strength of Example and Comparative Examples (in an Electrode-Like State)

Figure 6:
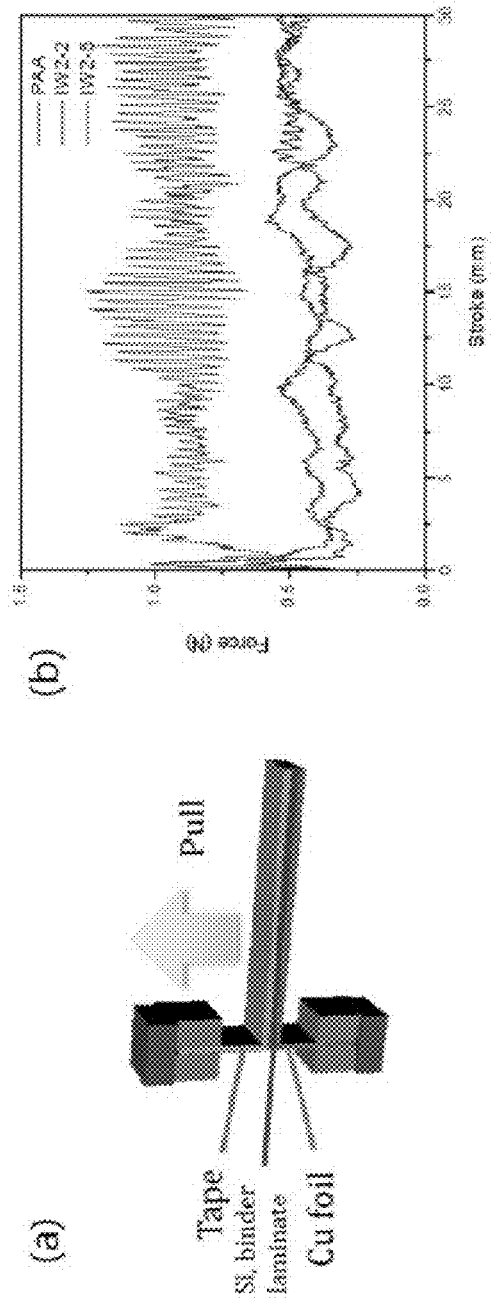
FIG. 6 (A) schematically illustrates a peel test in an electrode-like state, and FIG. 6 (B) illustrates stroke vs. force curves for Example and Comparative examples 1 and 2.

In Experimental example 3, a thick layer coated with a polymer binder is formed between a copper foil and an Si wafer. Adhesion is affected more by the degree of cross-linking between polymers than by interaction with silicon. Accordingly, in order to check whether adhesive strength in a bulk scale of Experimental example 3 is maintained in an actual electrode state, a peel test was performed in a state that is similar to an actual electrode. The result is shown in Table 3 and FIG. 6.

TABLE 3

Adhesive strength of the binders in an electrode-like state

| Binder | PAA | IW2-2 | IW2-5 |
|---|---|---|---|
| Initial Max. force(N) | 1.01 | 1.13 | 0.67 |
| Mean force(N) | 0.40 | 0.90 | 0.45 |

In the electrode-like state, binders (Example and Comparative examples 1 and 2) of different compositions exhibit adhesive strengths different from those in a bulk-scale. Specifically, the Example (IW2-2) shows the highest initial and mean adhesive strength. In general, as more poly(benzimidazole) is contained, carboxylic acid, which bonds with silicon particles, is further neutralized to be a salt to serve as a crosslinking bridge. However, in the case where poly(benzimidazole) is contained in an amount of 2% by weight, carboxylic acid that serves as a crosslinking bridge is contained in a small amount, which maximizes the cross-linking effect, enabling the highest initial adhesion. Further, the FAA-PBI blend binder is a physically cross-linked polymer, in which the cross-linking is reversible unlike a polymer such as anhydride that is cross-linked by covalent bond, and thus, acid-base interaction induced by peeling off an electrode from tape serves as resistance to electrode separation, thereby significantly improving mean adhesive strength compared to Comparative example 2. However, in Comparative example 1 (IW2-5) where more poly(benzimidazole) was used, the initial adhesive strength is the lowest, and the mean adhesive strength is similar to that of Comparative example 2 (PAA). It is assumed that as more poly(benzimidazole) was used, more carboxylic acid served as a cross-linking bridge, such that there were fewer functional groups that bond with silicon particles, and for this reason, the initial adhesive strength of silicon particles was lower than a poly(acrylic acid) binder. However, Comparative example 1 displays improved mean adhesive strength that is similar to Comparative example 2, since a physically cross-linked polymer is used with reversible acid-base interaction.

Experimental Example 5

Observing Tape Through an Optical Microscope after Carrying Out Experimental Example 4

Figure 7:
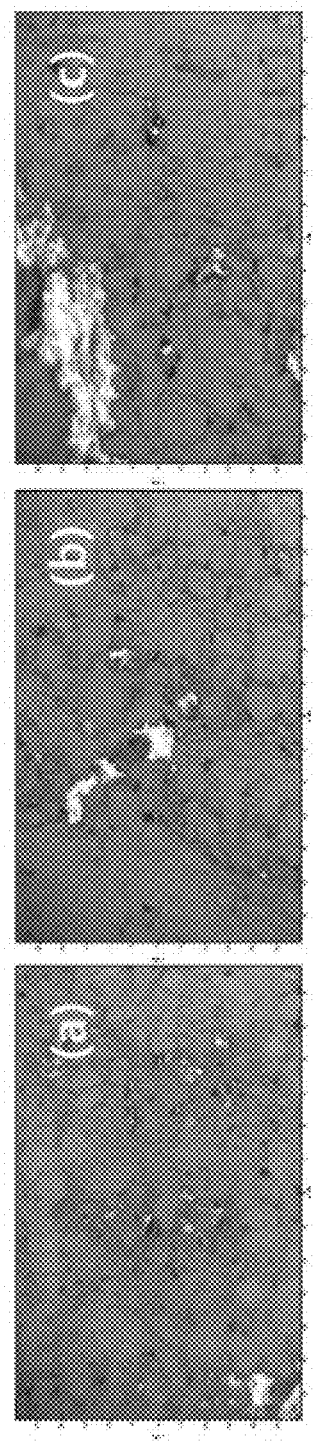
FIG. 7 illustrates optical microscopic images of tape after a peel test in an electrode-like state, showing: (a) Comparative example 2, (b) Example, and (c) Comparative example 1.

In order to identify whether the amount of electrodes shown in the result of Experimental example 4 is identical to the amount of actual electrodes, an electrode material that remains adhered to the tape after the peel test was observed with an optical microscope, and the result is shown in FIG. 7.

Upon observation, it was found that unlike the result of the peel test in an electrode-like state, as a degree of crosslinking increases, the amount of the electrode material remaining adhered to the tape decreases. Since the difference in the amount was so distinct that it could be seen with the naked eye, it is assumed that the difference results from a difference in adhesive strength in a bulk scale as can be seen from the result of Experimental example 3.

Accordingly, the adhesive strength in an electrode-like state is affected by the adhesive strength of a polymer binder with silicon particles, interaction between polymer binders, and the like.

Experimental Example 6

Microindentation Test of Example and Comparative Examples and Results

Figure 8:
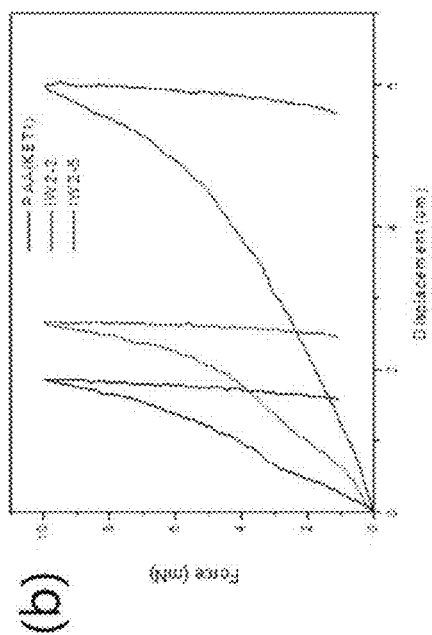
FIG. 8 (A) schematically illustrates a microindentation test, and FIG. 8 (B) illustrates force vs. displacement curves for the Example and Comparative examples 1 and 2.
Figure 8:
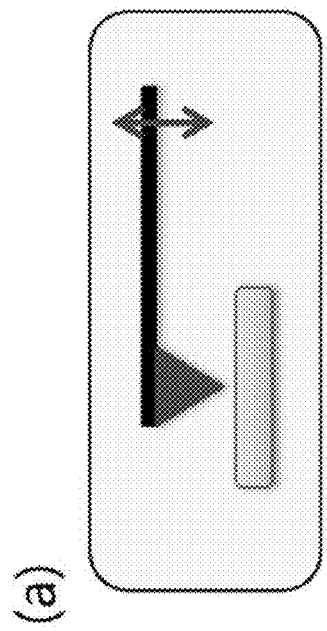

In order to measure elasticity of the Example and Comparative examples, microindentation test was carried out in an electrode-like state, and the result is shown in Table 4 and FIG. 8.

TABLE 4

Elastic moduli of Example and Comparative examples

| Binder | Elastic modulus(GPa) |
|---|---|
| PAA | 0.38 |
| IW2-2 | 0.64 |
| IW2-5 | 0.36 |

In the microindentation test, force is applied in a vertical direction to a coating material, such as an electrode, by using a tip, and when an applied force is removed while the coating material is deformed, force is applied in reverse from the coating material to the tip. During the process, elastic modulus may be obtained by measuring force applied (or received) by the tip and a moving distance. The elastic modulus R may be represented by the following Equation 1.

$$R = \frac{1}{\beta} \frac{\sqrt{\pi}}{2} \frac{S}{\sqrt{A}} \quad \text{Equation 1}$$

A: Projected contact area
β: Correction area
S: Slope of the unloading curve at maximum load From the experiment result, it could be understood that the Example (IW2-2) exhibits the highest elastic modulus, and Comparative example 1 (IW2-5) shows a lower elastic modulus than Comparative example 2 (PAA). The reason for this is that if poly(benzimidazole) is contained in an excessive amount, acid-base bond is also formed excessively, thereby reducing elasticity.

Experimental Example 7

Cell Performance Test of Example and Comparative Examples and Results

Figure 9:
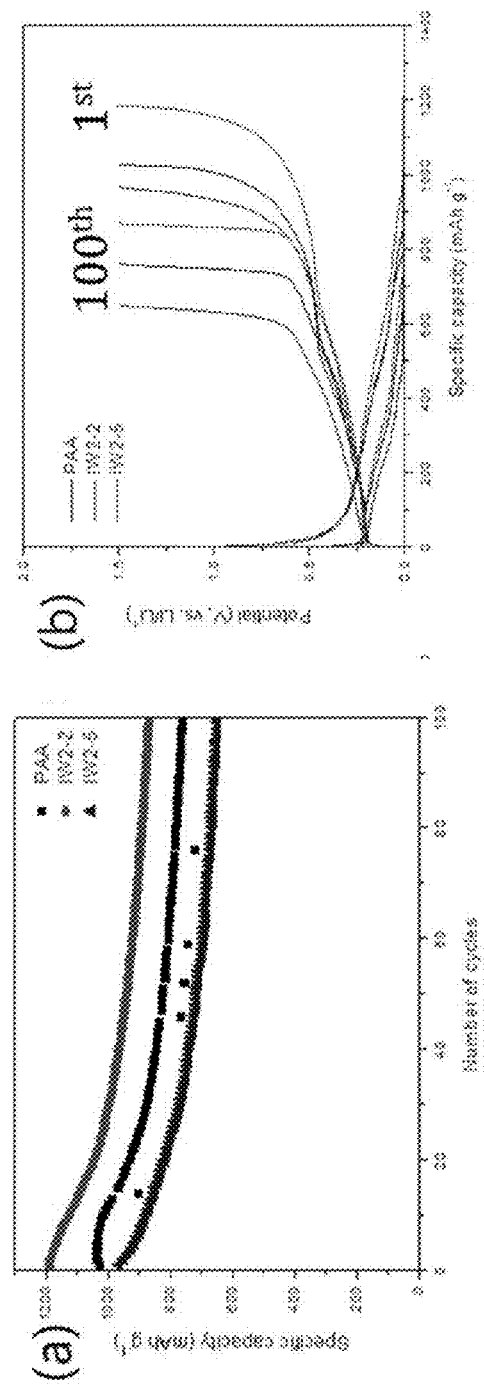
FIG. 9 illustrates cell performance of a silicon/graphite composite electrode with binders of Example and Comparative examples 1 and 2, showing: (a) cyclic performance at 1 C (1300 mAg$^{-1}$); and (b) a voltage profile after a first cycle and a 100$^{th}$ cycle.

A cell performance test was carried out by applying Example and Comparative examples, and the result is shown in FIG. 9.

As can be seen in Experimental examples 4 and 6, the Example (IW2-2) exhibits the highest cell performance. However, while exhibiting the highest adhesive strength in a bulk scale, Comparative example 1 (IW2-5) exhibits the lowest cell performance. The reason for this is that the binder material was easily deteriorated due to a poor adhesive strength and elasticity in an electrode-like state.

Further, all the three electrodes, to which Example and Comparative examples were applied, exhibited a slope formed by a solid-electrolyte interface due to decomposition of electrolyte in a range of 0.8 V to 0.25 V, and a plateau was formed in a range below 0.25V by lithium insertion into an anode material. From the experiment, it could be seen that a cross-linked polymer used in the experiment did not cause an electrochemical side reaction. However, positions of plateaus are slightly different for each polymer, and the Example (IW2-2) exhibits the highest discharge plateau and the lowest charge plateau. By contrast, Comparative examples 1 and 2 exhibited charge and discharge plateau voltage shift. As Comparative 2 (PAA) has many functional groups that may form ester bond with silicon particles, such that a thick polymer layer may be formed around silicon particles, and thus, may serve as a significant resistor during the diffusion of lithium ions. For this reason, a high overpotential occurs, leading to the shift of the plateau. In Comparative example 1 (IW2-5), a huge amount of poly (benzimidazole) reacts with carboxylic acid of poly(acrylic acid) in acid-base polymerization reaction, during which carboxylic acid serves as a crosslinking bridge rather than forming a covalent bond with silicon. However, a high-density polymer layer is formed on an entire electrode due to a high degree of crosslinking. Accordingly, it is assumed that since the binder also serves as an ion resistor, thereby leading to the shift of the plateau. However, in the Example (IW2-2), acid-base interaction was performed appropriately such that the formation of a thick polymer layer around silicon particles may be suppressed; and a degree of crosslinking was not high such that a polymer density may be low, compared to Comparative example 2 that forms a covalent bond or to Comparative example 1 (IW2-5) that exhibits a high degree of crosslinking, and thus, a relatively low overpotential was applied.

Experimental Example 8

Checking Initial Coulombic Efficiency

Figure 10:
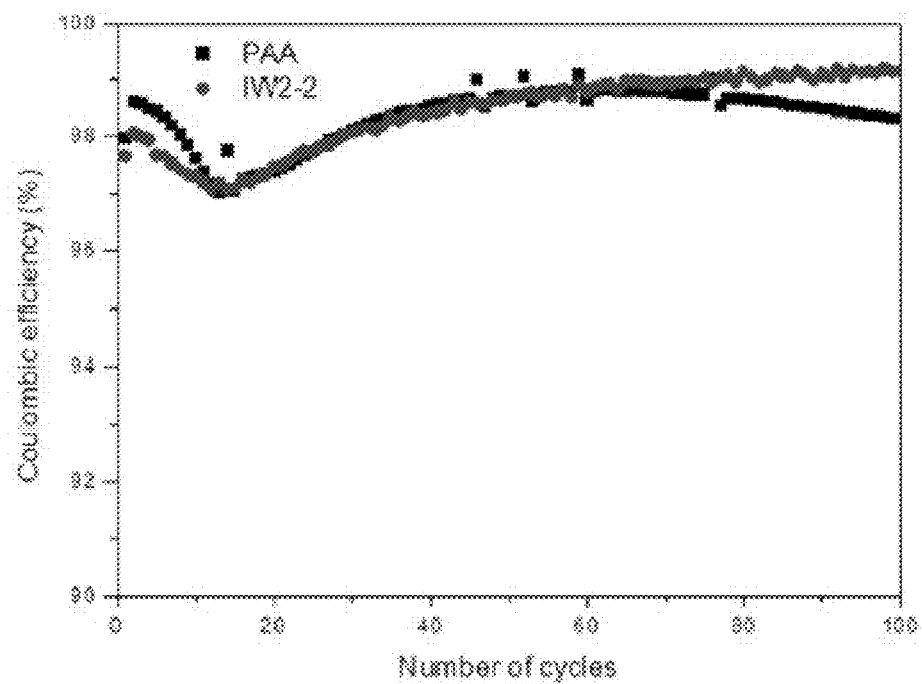
FIG. 10 illustrates coulombic efficiency vs. cycle number for Example and Comparative examples 1 and 2 up to 100 cycles.

In order to check whether interaction of silicon with carboxylic acid of poly(acrylic acid) is reduced as the amount of a cross-linking polymer is increased, as anticipated in Experimental example 4, initial coulombic efficiency was observed in the voltage profile for each polymer binder electrode, and the result is shown in FIG. 10. The result shows that as the amount of a cross-linking agent was increased from 0% to 5%, the initial coulombic efficiency, which was 98.0%, 97.6%, and 95.0%, respectively, was decreased. The reason for this is that there is a difference in the process of forming a solid-electrolyte interface of each polymer binder electrode. That is, a carboxylic functional group may generally prevent an active material from being directly exposed to an electrolyte by a strong interaction with silanol groups on the surface of silicon particles, thereby suppressing the decomposition of electrolyte at an electrode interface. By contrast, as the amount of cross-linking polymer is increased, the interaction of carboxylic acid with silanol is suppressed, such that silicon particles are exposed to an electrolyte, thereby reducing the initial coulombic efficiency due to the decomposition of electrolyte. However, in the Example (IW2-2), it is assumed that the amount of a cross-linking polymer was not large, the initial coulombic efficiency was similar to the electrode of Comparative example 2. However, unlike Comparative example 2 that exhibited unstable coulombic efficiency during cycles due to an unstable interface, the Example (IW2-2) exhibited improved coulombic efficiency since interface was stabilized within several cycles.

Experimental Example 9

Checking Rate Capability

Figure 11:
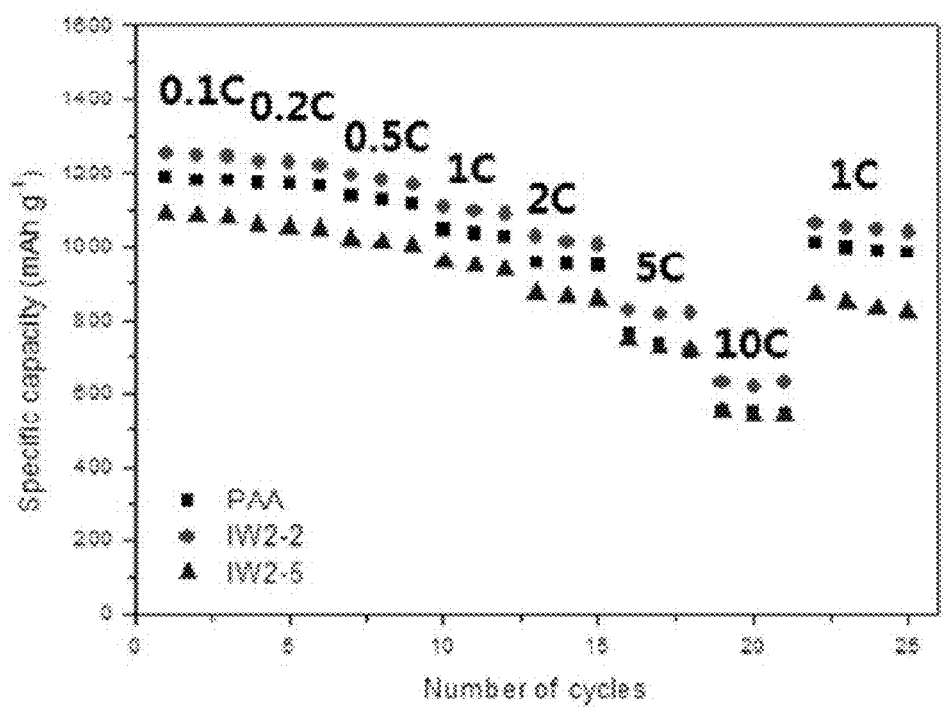
FIG. 11 illustrates graphs showing rate capability of Example and Comparative examples 1 and 2 at 0.1 C, 0.2 C, 0.5 C, 1 C, 2 C, 5 C, and 10 C.

A rate capability test was carried out to check whether each binder material may secure stable cell performance even at various constant current velocity, and the result is shown in FIG. 11. The Example (IW2-2) exhibited the highest performance at every constant current velocity; and Comparative example 1 (IW2-5) exhibited performance similar to Comparative example 2 at a high C-rate of 5 C and 10 C, since a high degree of crosslinking improved physical properties. However, in the performance test at a high C-rate of 1 C (which was conducted to confirm whether a binder may be recovered under mild conditions after being subjected to final harsh conditions, Comparative example 1 (IW2-5) exhibited much lower performance than Comparative example 2. It is assumed that the reason for this is that since the binder has too low elasticity to resist drastic change during a previous high-rate charge and discharge process, and was deteriorated.

Experimental Example 10

Analysis of Electrode Morphology Using SEM

Figure 12:
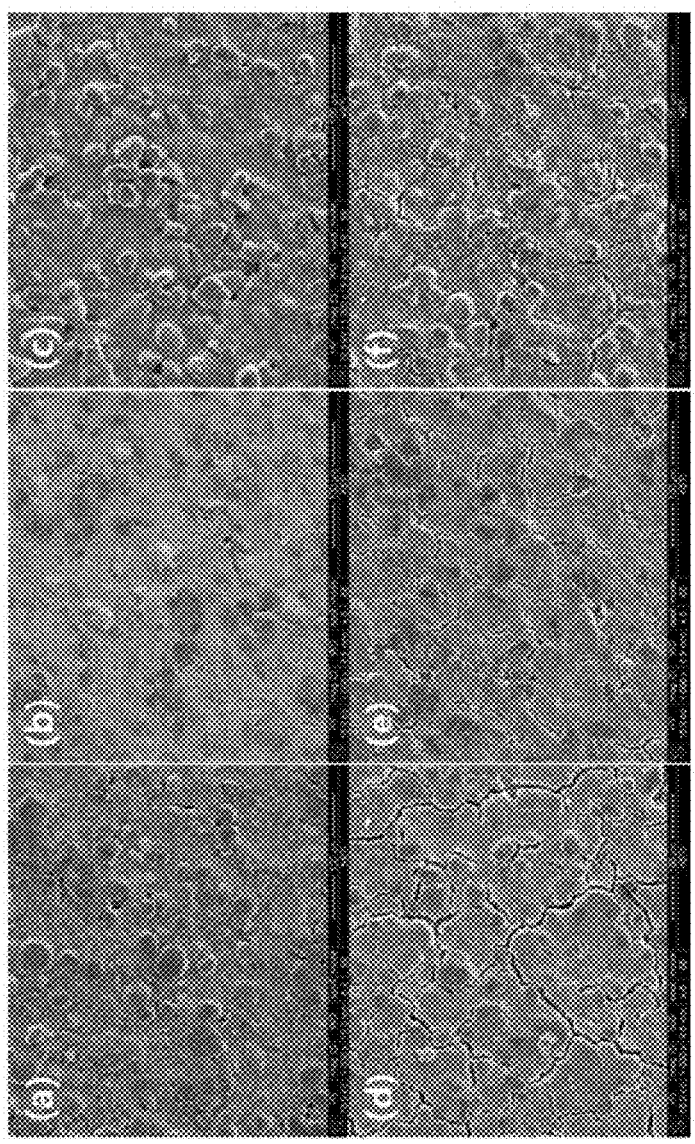
FIG. 12 illustrates: top-view SEM images of (a) Comparative example 2 (PAA), (b) Example (IW2-2), and (c) Comparative example 1 (IW2-5) before cycling; and top-view SEM images of (d) Comparative example 2 (PAA), (e) Example (IW2-2), and (f) Comparative example 1 (IW2-5) after cycling.

Morphology of an electrode was analyzed by using a Scanning Electron Microscope (SEM) to check whether there is a direct relationship between poly(acrylic acid)-poly (benzimidazole) blend polymer and cell performance, and the result is shown in FIG. 12.

Before cycling, three binders showed different images. The Example (IW2-2) showed an image of an even and flat surface, but other binders exhibited images of uneven surfaces with grains protruding therefrom. As anticipated from the voltage profile described above, it is assumed that the reason for different surface images is that since the density of a polymer during the production of an electrode varied depending on a degree of crosslinking or a degree of bonding with silicon particles, which affected dispersion. Accordingly, in the case of an electrode of Comparative example 2 (PAA), a thick polymer layer was formed around silicon particles due to excessive formation of ester bond with silicon particles, such that a relatively light conductive material (Super P) protrudes from the surface. In Comparative example 1 (IW2-5), the density of a polymer is increased on the entire electrode due to a high degree of crosslinking, such that relatively light silicon nanoparticles or conductive materials protrude from the surface. By contrast, in the Example (IW2-2), an appropriate bond with silicon and an appropriate density of a polymer prevents such particles from protruding and enables even and flat images thereof.

After cycling, an electrode of Comparative example 2 (PAA) had many fractures on its surface due to weak physical properties and irreversible crosslinking; however, an electrode of Comparative example 1 (IW2-5) had fractures, but their size was reduced by improved adhesive strength and reversible crosslinking. Further, the Example (IW2-2) showed a very small number of fractures, and the size thereof was very small due to significantly improved adhesive strength and reversible crosslinking.

Experimental Example 11

Analysis of a Cross-Section of an Electrode Using SEM

Figure 13:
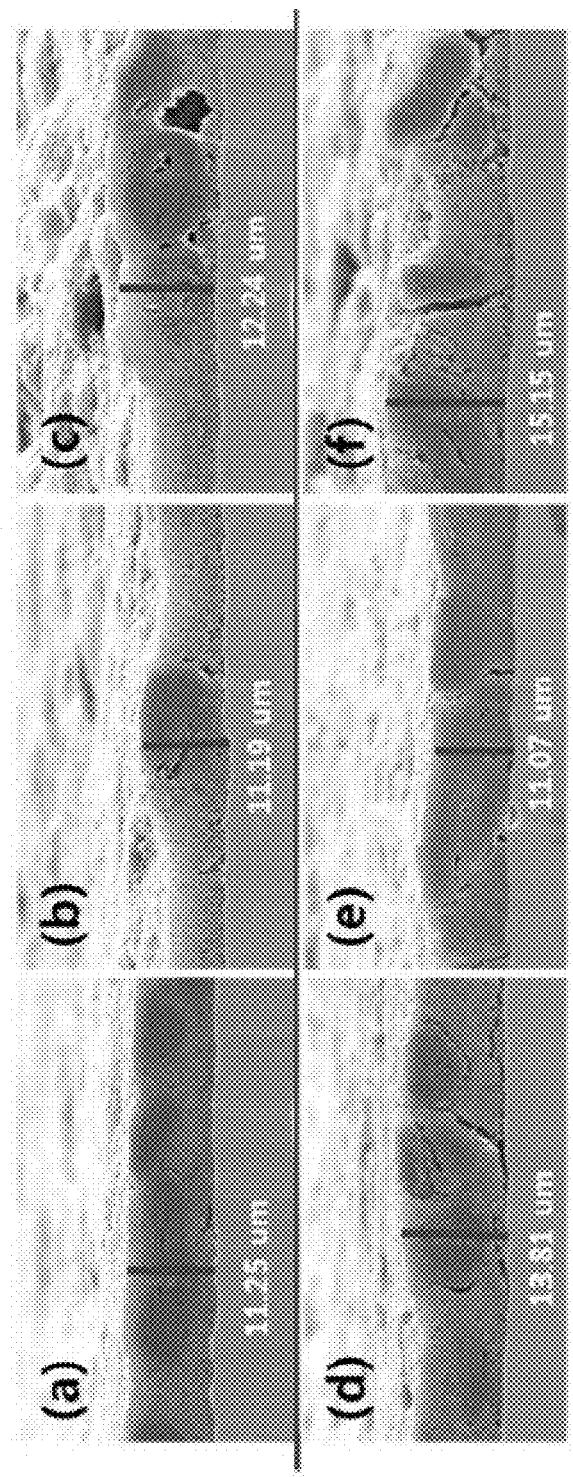
FIG. 13 illustrates: cross-sectional view SEM images of (a) Comparative example 2 (PAA), (b) Example (IW2-2), and (c) Comparative example 1 (IW2-5) before cycling; and cross-sectional view SEM images of (d) Comparative example 2 (PAA), (e) Example (IW2-2), and (f) Comparative example 1 (IW2-5) after cycling; and Throughout the drawings and the detailed description, unless otherwise described, the same drawing reference numerals will be used to refer to the same elements, features, and structures. The relative size and depiction of these elements may be exaggerated for clarity, illustration, and convenience.

A cross-sectional image of an electrode was observed using a SEM to see the effects of volume change of an electrode, and the result is shown in FIG. 13.

Before cycling, all the three binders exhibit similar thickness and shape of electrode. After cycling, however, an electrode of Comparative example 2 (PAA) had a huge fracture, and its thickness was changed by up to 23%, with part of the material separated from a copper current collector. Further, an electrode of Comparative example 1 (IW2-5) also had fractures, and its thickness was changed by up to 24%. By contrast, an electrode of the Example (IW2-2) has only a very small fracture, with almost no change in its thickness. Accordingly, through observations using a SEM, it could be seen that improved physical properties of a binder by crosslinking may suppress the fracture of an electrode; improved elasticity may suppress the volume change before and after cycling; and the suppression of fractures and volume change due to the improved physical properties of a polymer binder material may enhance cell performance.

In the present disclosure, poly(benzimidazole) (PBI) was used as a basic crosslinked polymer and blended with an acidic poly(acrylic acid) (PAA) polymer, so as to prepare a polymer binder that is physically and reversibly crosslinked by acid-base reaction. Depending on a blending ratio, the PAA-PBI blend polymer exhibited improved physical properties of higher elasticity and higher adhesive strength compared to a conventional poly(acrylic acid) polymer.

The electrode produced by using the polymer exhibited improved cell cycle life characteristics with a cycle life of 73% maintained after 100 cycles. Further, the electrode exhibited improved rate capability from a low rate of 0.1 C to a high rate of 10 C compared to a poly(acrylic acid) silicon electrode produced without physical crosslinking.

In addition, by decompressing a cell and by observing an electrode after cycling, a physically crosslinked polymer effectively suppressed the volume change during cell operation.

Accordingly, the novel physically crosslinked polymer binder improved the performance of silicon cells by a cost-effective and efficient method, and is expected to lay a foundation for future development of a more efficient technology.

In the present disclosure, the binder for silicon anode is physically bound to a crosslinking agent by acid-base interaction in the reversible physical cross-linking system, thereby securing excellent stiffness, elasticity, and adhesion and preventing deterioration of a binder for silicon anode that may be caused by the volume change of an eco-friendly and high-capacity silicon anode material.

In addition, the binder for silicon anode is bound to a crosslinking agent by electrostatic attraction, such that even when the binding is broken, rebinding may be enabled when two opposite charges sufficiently approach each other, thereby recovering and maintaining physical properties.

Moreover, even when cycles are repeated, volume change of a silicon anode material may be suppressed effectively, and battery cycle life may be improved.

The present disclosure is not limited to the above effects, and other effects not described above may be clearly understood by one of ordinary skill in the art.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus, the present invention is not limited thereto.

What is claimed is:

1. A highly elastic physically cross-linked binder induced by reversible acid-base interaction for high performance silicon anode, the binder comprising:
   a binder for silicon anode, wherein the binder is at least one selected from the group consisting of poly(acrylic acid) (PAA), carboxymethyl cellulose (CMC), and alginate; and
   a crosslinking agent that is physically bound with the binder for silicon anode by reversible acid-base interaction.

2. The binder of claim 1, wherein the silicon anode is prepared by using silicon or silicon-graphite composite material.

3. The binder of claim 1, wherein the crosslinking agent is basic.

4. The binder of claim 3, wherein the crosslinking agent comprises both a hydrogen bond donor and a hydrogen bond acceptor.

5. The binder of claim 3, wherein the crosslinking agent is at least one selected from the group consisting of poly (benzimidazole), guanidine-based polymers, imidazole-based polymers, polyaniline polymers, and polypyridine-based polymers.

6. The binder of claim 1, wherein the binder for silicon anode is poly(acrylic acid) (PAA), and the crosslinking agent is poly(benzimidazole).

7. The binder of claim 1, wherein the crosslinking agent is contained in an amount of 1 to 3% by weight compared to a weight of the binder for silicon anode.

\* \* \* \* \*